United States Patent
Migali et al.

(10) Patent No.: US 10,434,579 B2
(45) Date of Patent: Oct. 8, 2019

(54) PEELING MACHINE FOR OBLONG PRODUCTS

(71) Applicant: DANIELI & C. OFFICINE MECCANICHE S.P.A., Buttrio (IT)

(72) Inventors: Simone Antonio Migali, Udine (IT); Luca Crespan, Cervignano del Friuli (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 0 days.

(21) Appl. No.: 15/567,756

(22) PCT Filed: Apr. 21, 2016

(86) PCT No.: PCT/IB2016/052278
§ 371 (c)(1),
(2) Date: Oct. 19, 2017

(87) PCT Pub. No.: WO2016/170500
PCT Pub. Date: Oct. 27, 2016

(65) Prior Publication Data
US 2018/0117677 A1    May 3, 2018

(30) Foreign Application Priority Data
Apr. 21, 2015   (IT) .............................. UD2015A0055

(51) Int. Cl.
*B23B 5/12* (2006.01)
(52) U.S. Cl.
CPC ............ *B23B 5/12* (2013.01); *B23B 2215/72* (2013.01); *B23B 2220/40* (2013.01)

(58) Field of Classification Search
CPC .... B23B 5/12; B23B 2215/72; B23B 2220/40
See application file for complete search history.

(56) References Cited

U.S. PATENT DOCUMENTS

2010/0162861 A1    7/2010   Bartz et al.

FOREIGN PATENT DOCUMENTS

| JP | H0871803 A | 3/1996 |
| JP | 2011020216 A | 2/2011 |
| SU | 1360904 A1 | 12/1987 |
| WO | WO-2009033951 A1 * | 3/2009 ............... B23B 5/12 |

OTHER PUBLICATIONS

English translation of JP 2011020216, Feb. 2011 (Year: 2011).*
Int'l Search Report and Written Opinion dated Jul. 28, 2016 in Int'l Application No. PCT/IB2016/052278.

* cited by examiner

*Primary Examiner* — Alan Snyder
(74) *Attorney, Agent, or Firm* — Panitch Schwarze Belisario & Nadel LLP

(57) ABSTRACT

A peeling machine includes a rotating head installed rotating around an axis of rotation and provided with a central cavity. During use, an oblong product to be worked is disposed and a plurality of support sliders are installed thereon to support respective tools and a plurality of adjustment units configured to move the support sliders in a radial direction with respect to the axis of rotation. The peeling machine also includes a transmission unit configured to transmit motion from a first motor to the rotating head and to make the latter rotate, and also to transmit motion from a second motor to the adjustment units to simultaneously adjust the radial position of the tools.

10 Claims, 2 Drawing Sheets

PEELING MACHINE FOR OBLONG PRODUCTS

CROSS-REFERENCE TO RELATED APPLICATION

This application is a Section 371 of International Application No. PCT/IB2016/052278, filed Apr. 21, 2016, which was published in the English language on Oct. 27, 2016, under International Publication No. WO 2016/170500 A1, the disclosure of which is incorporated herein by reference.

FIELD OF THE INVENTION

The present invention concerns a peeling machine for oblong products, such as bars, tubes or similar or comparable products, preferably axial-symmetric.

The peeling machine according to the present invention is used to reduce, by means of chip removal, the diameter of the product to be worked, by means of tools disposed radially on a rotating head, in a central cavity of which the product to be worked is disposed.

BACKGROUND OF THE INVENTION

Peeling machines are known, which comprise feed means, suitable to axially feed each product to be worked along a longitudinal axis, and a rotating head which is provided with a through central cavity in which, during use, the product to be worked is made to pass.

The rotating head is made to rotate with respect to a fixed support, coaxially to the longitudinal axis, by means of first drive means.

The tools are installed on the rotating head and are associated with corresponding adjustment devices which each comprise a slider, radially mobile with respect to the longitudinal axis and on which one of the tools is installed.

Each adjustment device also comprises a wedge-type hub connected to the slider that supports the tool.

The wedge-type hub can be moved in a direction parallel to the longitudinal axis by the action of screwing, in one direction or the other, a calibrated screw disposed with its axis of rotation substantially parallel to the longitudinal axis, and which screws onto/from the wedge-type hub.

The calibrated screw is selectively driven by second drive means.

Control means and a kinematic-differential unit are interposed between the second drive means and the calibrated screw to determine the selective and simultaneous activation of the latter, and to perform the micrometric adjustment of the radial position of the tools, also while the rotating head is rotating.

In particular, a rotation of the second drive means is transmitted to the calibrated screw by an array of toothed wheels to make the calibrated screw rotate in one direction or the other, thus moving the wedge-type hub, and in turn the sliders and corresponding tools, with a consequent variation in the diameter of the product.

The presence of a wedge-type hub to determine the radial movement of the tools greatly limits the radial travel to which they can be subjected. Indeed, high radial travels of the tools would entail a considerable increase in the bulk of the rotating heads.

Furthermore, the known peeling machine described above, given its configuration, can be used only for limited ranges of size of the oblong product to be worked, dictated by the particular sizes of the rotating head. If it is necessary to process oblong products with very different values of size, the rotating head must be replaced depending on the sizes of the oblong product to be processed.

A peeling machine is also known, from DE-A-10.2009.041.340, which comprises a rotating head on which a plurality of tools are installed. The rotating head is made to rotate by a first motor connected to the rotating head by a pinion and a toothed crown installed on the head.

The tools are installed mobile radially with respect to the working axis of the machine. The radial movement of each tool is commanded by a plurality of toothed elements made to rotate simultaneously by a toothed crown. The toothed crown is installed on the rotating head and a second motor acts upon it, configured to make the toothed crown rotate and in this way to adjust the position of the tools. To keep the tools in a fixed radial position with respect to the rotating head, the second motor has to be driven with a speed of rotation that is a function of the speed of rotation of the first motor. However, this solution requires a control of the speed of rotation of the first motor and the second motor that are difficult to obtain precisely.

Furthermore, this solution requires that, during the peeling of a metal product, the second motor that adjusts the position of the tools is driven to prevent any loss of positioning of the tools from occurring.

The known solutions described above are also particularly complex to achieve and present considerable difficulties in calibrating the tools because of the large number of components and the mechanical plays between them, which make the peeling machine not very precise.

Document JP-A-2011-020216 describes a turning machine in which the product to be worked is kept in a fixed position by vises while the cutting head is moved linearly along linear guides in order to perform the turning.

However, turning machines are very different in construction from peeling machines and are therefore not suitable for performing peeling operations on tubular products.

Merely by way of example, a turning machine does not allow to work very long tubular products because it is not possible to pass the material through the machine.

Moreover, in the solution shown in JP-A-2011-020216, the adjustment system is positioned on the side opposite the cutting head and the adjustment action is transmitted through a hollow shaft installed coaxially to the axis of the machine and the product to be worked is made to pass through at least part of this. The sizes of the hollow shaft limit the maximum sizes of the metal product to be worked. Furthermore, in the solution shown in JP-A-2011-020216, the adjustment system consists of a harmonic reducer or an epicycloid differential which takes the motion from the main motor by means of suitable reduction gears that also invert the direction of rotation. This solution is particularly complex given the large number of toothed components which not only increase the cost of the machine but also result in a system that is less rigid and hence less precise.

There is therefore a need to perfect a peeling machine for oblong products that can overcome at least one of the disadvantages of the state of the art.

In particular, one purpose of the invention is to obtain a peeling machine which is simple to make and compact.

Another purpose of the present invention is to obtain a peeling machine which is extremely versatile and can be used for different ranges of size.

Another purpose of the present invention is to obtain a peeling machine that is more efficient and precise compared with known solutions.

Another purpose of the present invention is to obtain a peeling machine that allows to adjust the position of the tools also during the normal functioning of the peeling machine in order to obtain a product with different diameters.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns a peeling machine comprising feed means provided to feed an oblong product along an axis of rotation, and a rotating head installed rotating around the axis of rotation and provided with a through central cavity in which, during use, the oblong product to be worked is disposed through and on which a plurality of support sliders are installed to support respective tools and a plurality of adjustment units configured to move the support sliders in a radial direction with respect to the axis of rotation.

The peeling machine also comprises a first kinematic transmission configured to transmit motion from a first motor to the rotating head and to make the latter rotate, and a second kinematic transmission configured to transmit motion from a second motor to the adjustment units and to simultaneously adjust the radial position of the tools.

According to one aspect of the present invention, each adjustment unit comprises a worm screw, such as for example a recirculating roller screw, disposed with its screwing axis in a radial direction with respect to the axis of rotation and screwed onto the support slider.

Using a recirculating roller screw allows to obtain a precise positioning of the support slider, since the mechanical plays between the components are very limited.

According to variants, the worm screw can possibly comprise a recirculating ball screw.

According to another aspect of the present invention, the second kinematic transmission is kinematically connected to the worm screws by means of a toothed crown installed on the rotating head.

According to another aspect of the present invention, the machine comprises a mechanical differential device kinematically connected between the second motor, the first kinematic transmission and the second kinematic transmission. The differential device is configured to take the toothed crown into rotation at the same speed as the rotating head and to keep the support sliders in a fixed radial position when the second motor is not driven, and to make the toothed crown rotate with a differential speed with respect to the rotating head and to move the support sliders radially when the second motor is driven.

This solution allows to obtain an extremely compact peeling machine compared to the known technical solutions, and allows to peel even very short metal products.

Moreover, the presence and particular disposition of worm screws to adjust the position of the tools allows to considerably increase the travels that the tools can make during chip removal workings.

The solution described above also allows to reduce the complexity of the transmission between the motors and the rotating head, also reducing the number of components of the peeling machine, thus giving the advantage of a more precise and efficient working.

In fact, thanks to the configuration described above, it is possible to obtain a cutting head that can be used to cover a vast range of sizes of the materials to be processed.

Furthermore, this solution can be applied to all sizes of machines, thus allowing to standardize them.

Here and hereafter in the description and claims, except where not expressly specified, the term "kinematic connection" means a connection obtained by mechanical connection members configured to transmit a rotational motion from a first shaft to one or more second shafts. The kinematic transmission can be obtained for example with gears, toothed wheels and belts, toothed wheels and chains, or with other kinematic connection devices known to the person of skill.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
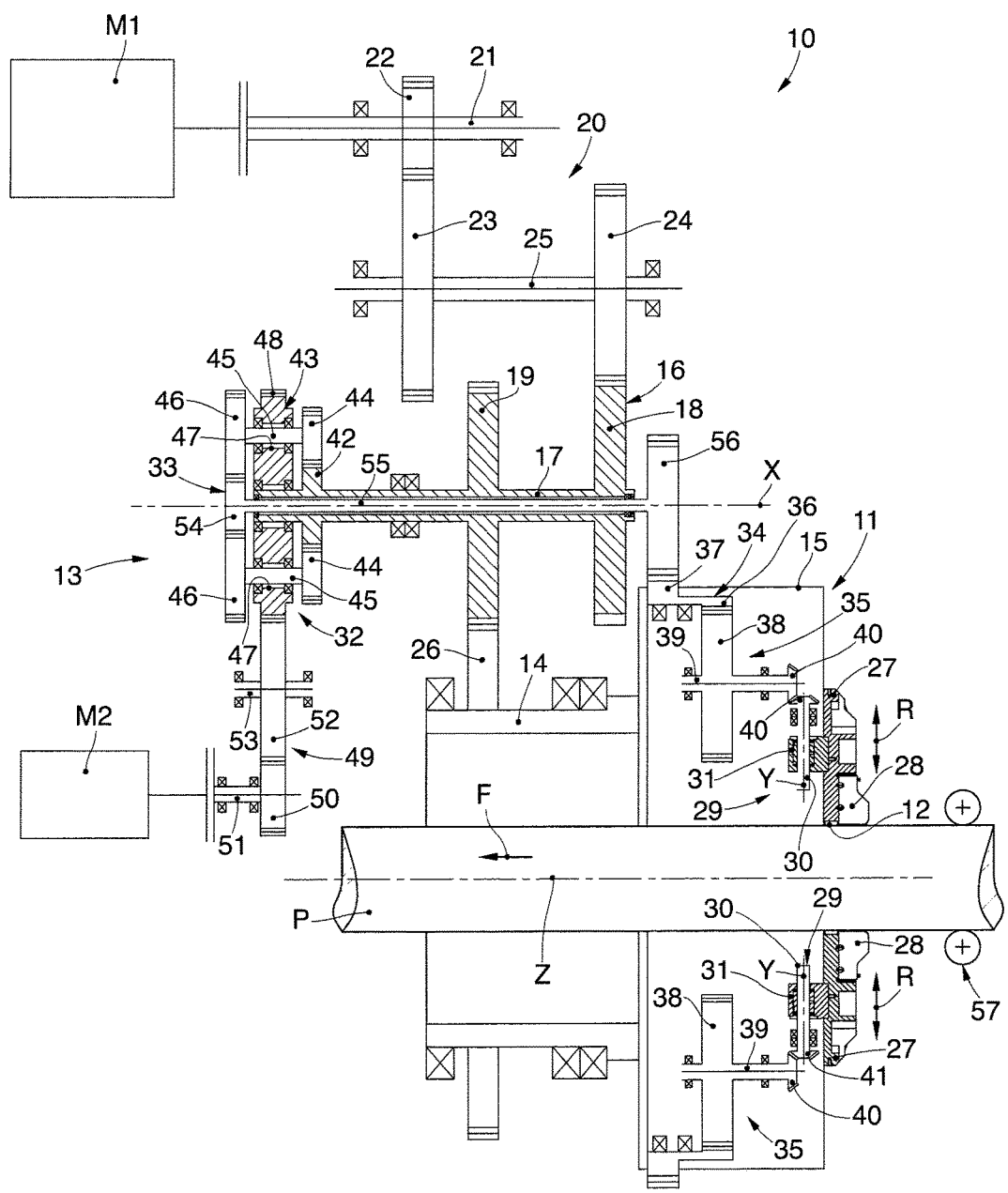
FIG. 1 is a schematic view of a peeling machine according to the present invention.

FIG. 1 is used to describe example embodiments of a peeling machine 10 for peeling oblong and preferably axial-symmetric products P, such as bars, tubes, poles or similar or comparable products, having a mainly oblong development.

The peeling machine 10 comprises a rotating head 11, selectively rotatable around an axis of rotation Z and provided with a through central cavity 12 in which, during use, the oblong product P is positioned through and made to transit.

The rotating head 11, although rotatable around the axis of rotation Z, is kept in a fixed axial position with respect to the axis of rotation Z.

In particular, the oblong product P, during working, is positioned with its axis of oblong development substantially parallel and coincident with the axis of rotation Z, and is fed in a direction of feed F, indicated in FIG. 1, parallel to the axis of rotation Z.

The peeling machine 10 is provided with feed means 57, provided to feed the oblong product P along the axis of rotation Z.

The peeling machine 10 comprises a first motor M1, connected by a transmission unit 13 to the rotating head 11 to make the latter selectively rotate around the axis of rotation Z.

According to the solution in FIG. 1, between the first motor M1 and the transmission unit 13 a first reduction unit 20 is interposed, configured to reduce the speed of rotation of the first motor M1 and which is transmitted to the first reduction unit 20.

The first reduction unit 20 comprises a first rotation shaft 21 connected, in this case by a joint, to the drive shaft of the first motor M1.

The joint can be a rigid joint, an elastic joint, a mixed rigid-elastic joint, a friction joint, or similar or comparable mechanical members.

A first pinion toothed wheel 22 is installed on the first rotation shaft 21, and is solidly rotatable therewith.

The first reduction unit 20 also comprises a second rotation shaft 25, on which a first driven toothed wheel 23 and a second driven toothed wheel 24 are solidly installed. The first driven toothed wheel 23 engages directly on the first pinion toothed wheel 22, while the second driven toothed wheel 24 is configured to transmit the rotational motion to the transmission unit 13.

Driving the first motor M1 makes the first pinion toothed wheel 22 rotate, and consequently also the first driven toothed wheel 23 connected to it, and the second driven toothed wheel 24, since it is connected to the latter by the second rotation shaft 25. Therefore, the second driven toothed wheel 24 rotates at the same angular speed as the first driven toothed wheel 23, since they are both solid with the second rotation shaft 25.

The transmission unit 13 comprises a first kinematic transmission 16 configured to transmit the rotational motion from the first motor M1 to the rotating head 11.

According to the solution shown in FIG. 1, the first kinematic transmission 16 comprises a hollow shaft 17 kinematically connected to the first motor M1 to determine its rotation around an axis of rotation X.

According to the embodiment shown in FIG. 1, the hollow shaft 17 is kinematically connected to the first motor M1 through the first reduction unit 20.

According to the embodiment in FIG. 1, a drive toothed wheel 18 is installed on the hollow shaft 17 and is connected to the first motor M1, in this case which engages kinematically with the second driven toothed wheel 24 of the first reduction unit 20.

The hollow shaft 17 is in turn kinematically connected to the rotating head 11 so that the rotational motion transmitted by the first motor M1 is transmitted through the first kinematic transmission 16 to the rotating head 11 to determine the rotation of the latter around the axis of rotation Z.

According to the embodiment in FIG. 1, the hollow shaft 17 can be provided with an intermediate toothed wheel 19, keyed on the hollow shaft 17 and which engages on a drive toothed wheel 26 solidly installed on the rotating head 11.

According to a possible variant, the drive toothed wheel 26 can engage directly on the drive toothed wheel 18 of the hollow shaft 17, determining a direct transmission of the motion from the first motor M1 to the rotating head 11.

According to another variant, it can be provided that the first motor M1 is directly connected to the drive toothed wheel 18, for example by a pinion toothed wheel, without the first reduction unit 20 being interposed.

According to the solution in FIG. 1, the rotational motion of the motor M1 is transmitted from the first reduction unit 20 to the drive toothed wheel 18, and therefore to the hollow shaft 17.

The hollow shaft 17 in turn makes the intermediate toothed wheel 19 rotate, which engaging on the drive toothed wheel 26 determines the rotation of the rotating head 11.

A plurality of support sliders 27 are installed on the rotating head 11, configured to each support a peeling tool 28. The support sliders 27 and the tool 28 are installed on the rotating head 11.

According to the solution in FIG. 1, the rotating head 11 includes a mandrel 14 and a support body 15, solid with each other and selectively rotatable around the axis of rotation Z.

The drive toothed wheel 26 is solidly attached to the mandrel 14.

The support sliders 27 are installed on the support body 15.

The support sliders 27 can be installed sliding on sliding guides, not shown in FIG. 1, located radially to the axis of rotation Z and provided or made in the rotating head 11, in this case in the support body 15.

A plurality of adjustment units 29 are also installed on the rotating head 11, and are configured to move the support sliders 27 in a radial direction R with respect to the axis of rotation Z, as shown in FIG. 1.

The adjustment units 29 and the support sliders 27, during use, are made to rotate by the rotating head 11 around the axis of rotation Z.

According to one aspect of the present invention, each adjustment unit 29 comprises a worm screw 30 disposed with its screwing axis Y in a radial direction R with respect to the axis of rotation Z, and screwed onto one of the support sliders 27.

According to some embodiments of the invention, the worm screw 30 can be either a recirculating roller screw or a recirculating ball screw.

In particular, according to the embodiment in FIG. 1, each support slider 27 is equipped with a female screw 31 into which the worm screw 30 is screwed.

The peeling machine 10 according to the present invention also includes a second motor M2, kinematically connected to the adjustment units 29 of the support sliders 27 through the transmission unit 13.

According to one aspect of the present invention, the transmission unit 13 is kinematically connected to the worm screws 30 to make them selectively rotate and to determine the movement toward/away from the axis of rotation Z of the tools 28.

According to another aspect of the present invention, the transmission unit 13 comprises a mechanical differential device 32 kinematically connected between the second motor M2, the first kinematic transmission 16 and a second kinematic transmission 33 connected to the adjustment units 29 so that, when the second motor M2 is driven, there is a corresponding adjustment of the tools 28 with respect to the axis of rotation Z.

In particular, the combination of the configuration of the transmission unit 13 and the differential device 32 allows to adjust the position of the tools 28 even if the rotating head 11 is rotating around the axis of rotation Z.

Furthermore, it is provided that the hollow shaft 17 of the first kinematic transmission 16 is kinematically connected to the first motor M1, the rotating head 11 and the differential device 32.

According to the embodiment shown in FIG. 1, the transmission unit 13 comprises the second kinematic transmission 33 cited above, kinematically connected to the worm screws 30 and, through the differential device 32, to the first kinematic transmission 16.

According to the solution shown in FIG. 1, the hollow shaft 17 is provided with a transmission toothed wheel 42, rotatable solidly with the hollow shaft 17 around the axis of rotation X.

The transmission toothed wheel 42 is kinematically connected to the differential device 32 and functions as a solar toothed wheel for the satellite wheels of the differential device 32.

The differential device 32 comprises at least a first satellite toothed wheel 44, in this case three first satellite toothed wheels 44, which engage on the transmission toothed wheel 42.

Each first satellite toothed wheel 44 is solidly installed on a satellite-carrier shaft 45. On each satellite-carrier shaft 45 a second satellite wheel 46 is also installed, rotatable solidly with the first satellite toothed wheel 44.

The differential device 32 also comprises a satellite-carrier wheel 43, installed rotating around an axis coinciding with the axis of rotation X and configured to rotatably support idly said satellite-carrier shafts 45, and so that the first satellite toothed wheels 44 engage on the transmission toothed wheel 42. The axes of rotation of the satellite-carrier shafts 45 are located parallel to the axis of rotation X of the hollow shaft 17.

The satellite-carrier wheel 43 is provided with housing seatings 47 in which the satellite-carrier shafts 45 are positioned through. The satellite-carrier shafts 45 can be installed rotatable idly on support elements, such as bearings provided in the housing seatings 47.

The satellite-carrier wheel 43 is kinematically connected to the second motor M2 which is configured to make the satellite-carrier wheel 43 rotate around the axis of rotation X, making the first satellite toothed wheels 44 orbit around the transmission toothed wheel 42, that is, making the satellite-carrier shafts 45 rotate around the axis of rotation X.

According to the present invention, the second motor M2 is configured so that, in its inactive configuration, it prevents the rotation of the satellite-carrier wheel 43. In this condition therefore, the satellite-carrier shafts 45 are rotatable only around their own axes of rotation but not around the axis of rotation X.

By way of example, the second motor M2 can be a stepper motor, a brushless motor, or a motor suitable to define a precise and accurate rotation of the satellite-carrier wheel 43.

According to the embodiment in FIG. 1, the satellite-carrier wheel 43 is provided with an external toothing 48 configured to engage with a second reduction unit 49 interposed between the second motor M2 and the satellite-carrier wheel 43.

Figure 2:
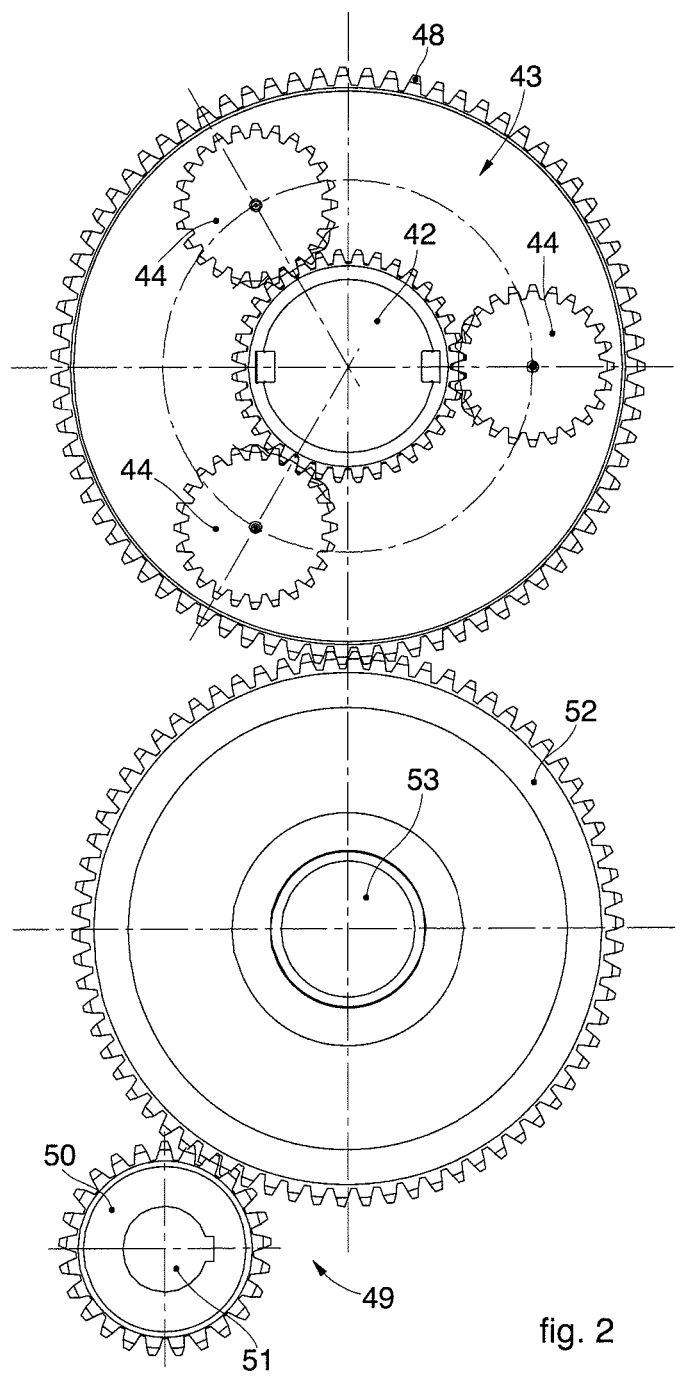
FIG. 2 is a front view of some components of a peeling machine according to the present invention.

According to variants described using FIGS. 1 and 2, the second reduction unit 49 comprises a second motor pinion 50 keyed onto a second motor shaft 51 and a driven wheel 52 keyed instead onto a driven shaft 53.

The second motor shaft 51 is connected to the second motor M2 for example by a mechanical joint. The driven shaft 53 is installed rotating idly around its own axis of rotation, for example on supports such as bearings or bronzes.

Furthermore, the driven wheel 52 is connected to the satellite-carrier wheel 43 of the differential device 32.

Driving the second motor M2 therefore makes the second motor pinion 50 rotate and consequently also the driven wheel 52 connected to it, which in turn transmits motion to the satellite-carrier wheel 43.

The second satellite wheels 46 are kinematically connected to the second kinematic transmission 33, thus defining the kinematic connection between the first kinematic transmission 16, the differential device 32 and the adjustment units 29.

The second kinematic transmission 33 comprises a first toothed wheel 54 solidly installed on the transmission shaft 55 and defining the kinematic connection between the differential device 32 and the second kinematic transmission 33.

According to the solution shown in FIG. 1, the first toothed wheel 54 engages on the at least one second satellite toothed wheel 46, in this case on three satellite toothed wheels 46. The first toothed wheel 54 is installed rotating around its own axis which coincides with the axis of rotation X of the hollow shaft 17. The first toothed wheel 54 functions as a solar toothed wheel for the second satellite toothed wheels 46.

According to the embodiment shown in FIG. 1, the first satellite toothed wheels 44 have a nominal diameter equal to the nominal diameter of the first toothed wheel 54 while the second satellite toothed wheels 46 have the same nominal diameter as the transmission toothed wheel 42.

According to one aspect of the present invention, the second kinematic transmission 33 comprises a transmission shaft 55 inserted into the hollow shaft 17 and kinematically connected to the differential device 32 and to a toothed crown 34 for the kinematic connection of the second kinematic transmission 33 and the worm screws 30. This solution allows to greatly reduce the overall bulk of the peeling machine 10 according to the present invention, and also to contain the number of operating components provided, reducing the relative plays thereof.

The toothed crown 34 allows to synchronize the movements of the tools 28 moving toward/away from the axis of rotation Z.

According to a possible embodiment, the hollow shaft 17 and the transmission shaft 55 have their axes of rotation X disposed parallel and distanced from the axis of rotation Z of the rotating head 11. This solution allows to dispose the mechanisms that transmit the rotation motion of the rotating head 11 and the adjustment of the position of the tools 28 in a position outside the central cavity 12 of the rotating head 11, thus allowing to increase the sizes of the rotating head 11 and therefore the diameters of the oblong product P that can be worked.

According to the variant in FIG. 1, the first toothed wheel 54 is installed solidly on the transmission shaft 55 installed in the axial cavity of the hollow shaft 17 and coaxial therewith. This solution allows to drastically compact the overall bulk of the peeling machine 10, allowing to work short oblong products as well.

In particular, the transmission shaft 55 is positioned protruding cantilevered with the respective ends on one side and the other of the hollow shaft 17.

The first toothed wheel 54 is installed at one of the ends of the transmission shaft 55.

According to the solution in FIG. 1, the transmission shaft 55 is installed on supports or bearings attached in the cavity of the hollow shaft 17. However, it is not excluded that the supports of the transmission shaft 55 can be installed outside the hollow shaft 17.

According to the solution in FIG. 1, the transmission shaft 55 is provided with a second toothed wheel 56, installed solid on the opposite end of the transmission shaft 55 to that where the first toothed wheel 54 is installed.

The second toothed wheel 56 is kinematically connected to the adjustment units 29, through the toothed crown 34, to define the adjustment of the position of the tools 28.

The second kinematic transmission 33 is configured so that, when the second motor M2 is in the inactive condition, the worm screws 30 are not made to rotate, while when the second motor M2 is in the active condition the worm screws 30 are made to rotate, determining an adjustment of the position of the tools 28.

According to the solution shown in FIG. 1, the toothed crown 34 is installed on the support body 15 in a selectively rotatable manner, also with respect to the support body 15, around an axis coinciding with the axis of rotation Z. The toothed crown 34 is kinematically connected to the worm screws 30 and to the second kinematic transmission 33.

According to the solution in FIG. 1, the toothed crown 34 is connected to the second toothed wheel 56 of the transmission shaft 55, to receive motion therefrom. If the second motor M2 is stationary, that is, inactive, the differential device 32 and the second kinematic transmission 33 are configured so that the peripheral speed of rotation of the second toothed wheel 56 corresponds to the peripheral speed of rotation of the rotating head 11. This condition prevents any relative rotational motion being established between the toothed crown 34 and the rotating head 11, which would cause the drive of the adjustment units 29.

In particular, between the toothed crown 34 and each of the worm screws 30 intermediate gears 35 are provided, installed on the support body 15 and mobile solidly with the rotation of the rotating head 11.

The first kinematic transmission 16 and the second kinematic transmission 33 are configured so that, when the second motor M2 is inactive, the transmission ratio established between the first motor M1 and the rotating head 11 is the same as that established between the first motor M1 and the toothed crown 34. This condition means that the toothed crown 34 is made to rotate together with the support body 15 without any movement with respect to the latter. The intermediate gears 35 between the toothed crown 34 and the worm screws 30 do not cause any rotation of the worm screws 30 and therefore the tools 28 remain stationary.

When the second motor M2 is active, the differential device 32 is configured to determine a rotation differential between the toothed crown 34 and the support body 15 of the rotating head 11.

The speed differential between the toothed crown 34 and the support body 15 determines the activation of the intermediate gears 35 and therefore a rotation of the worm screws 30 around the screwing axis Y.

In particular, when the second motor M2 is driven, the satellite-carrier wheel 43 makes the satellite-carrier shafts 45 rotate around the axis of rotation X, making the first satellite toothed wheels 44 orbit around the transmission toothed wheel 42 and the second satellite toothed wheels 46 around the first toothed wheel 54.

Depending on the direction of rotation of the satellite-carrier wheel 43, it is possible to accelerate or decelerate the entity of rotation of the first satellite toothed wheels 44 and the second satellite toothed wheels 46 around their axes, generating an acceleration or deceleration in the speed of rotation of the first toothed wheel 54.

According to the solution shown in FIG. 1, the toothed crown 34 is provided with an internal toothing 36 kinematically connected to the worm screws 30, and with an external toothing 37 kinematically connected to the second kinematic transmission 33.

According to a possible solution, shown in FIG. 1, the internal toothing 36, made on the internal surface of the toothed crown 34, is kinematically connected to the intermediate gears 35 and the external toothing 37, made on the external surface of the toothed crown 34, is kinematically connected to the second kinematic transmission 33 through the second toothed wheel 56.

According to the embodiment shown in FIG. 1, for each adjustment unit 29, the intermediate gears 35 comprise a calibration toothed wheel 38 that engages on the internal toothing 36 of the toothed crown 34 and which is installed rotating around a shaft 39. The shaft 39 is installed rotating around its axis of rotation on supports attached on the support body 15. The axis of rotation of the shaft 39 is located substantially parallel to the axis of rotation Z.

A first conical toothed wheel 40 is associated with each shaft 39, and is rotatable solidly with the shaft 39.

Each first conical toothed wheel 40 in turn engages on a respective second conical toothed wheel 41 associated solidly with one of the worm screws 30.

In this way, if the differential device 32 generates a relative rotation of the toothed crown 34 with respect to the support body 15 of the rotating head 11, a rotation is determined of the calibration toothed wheels 38 and at the same time of the first conical toothed wheel 40. The rotation of the first conical toothed wheel 40 also determines a rotation of the second conical toothed wheel 41 and therefore of the worm screw 30.

According to variants, position transducers can be associated with the first motor M1 and the second motor M2.

According to variants, the position transducers can be encoders for example.

According to other variants, the position transducers can be connected to a control unit.

The position transducers are configured to send to the control unit the datum of the angular position of the corresponding motor M1, M2.

The control unit can also be connected to the feed means 57 and position sensors, and can be suitable to constantly control the data supplied by the position transducers and to compare them with those sent by the position sensors in order to adjust the tools 28 according to the programmed profile of the oblong product P to be worked, or being worked, to be obtained.

According to further variants, a safety stoppage of the peeling machine 10 can be provided, if the data of the position sensors and position transducers do not converge with those of a function loaded into the control unit.

According to further variants, a laser ray device can also be provided, positioned downstream of the tools 28 and connected to the control unit.

The function of the laser ray device is to constantly control the actual size of the oblong product P already worked, and to send the data to the control unit, which is programmed to define the adjustment values of the tools 28 as a function of the discrepancy between the programmed size and the actual size of the oblong product P, which could be different from each other due to wear on the tools 28.

The radial adjustment of the tools 28 with respect to the longitudinal axis Z takes place as follows.

Under normal operating conditions, the first motor M1 rotates, controlled by the control unit, while the second motor M2 is stationary. Because the rotating head 11 and the adjustment unit 29 rotate at the same angular speed, in this condition the tools 28 maintain a determinate radial position with respect to the longitudinal axis Z.

When the radial position of the tools 28 is to be varied, and hence the diameter of the oblong product P being worked, the second motor M2 has to be activated and the second motor pinion 50 has to be rotated, in a clockwise or anti-clockwise direction, to reduce or increase, respectively, the diameter of the oblong product P being worked.

The adjustment operation can also be carried out while the rotating head 11 is rotating, that is, without stopping the first motor M1.

In particular, the radial position of the tools is adjusted as follows:

the second motor M2 is made to rotate by a signal from the control unit, making it make a number of revs and/or a fraction of revs equal to the correction desired. In this specific case, the value of the correction on the diameter of the oblong product P is equal to 0.01 mm for every 22.5 degrees of rotation of the second motor M2, that is, for every sixteenth of a rev;

the rotation of the second motor M2 is controlled by the position transducer;

the second motor pinion 50 transmits rotation to the driven wheel 52 and hence to the satellite-carrier wheel 43;

the satellite-carrier wheel 43 makes the satellite-carrier shafts 45 rotate and hence imposes a relative speed to the second satellite toothed wheels 46 with respect to the first toothed wheel 54, which increase or subtract speed to/from the first toothed wheel 54, connected by the transmission shaft 55 to the second toothed wheel 56;

by means of the toothed crown 34 and the calibration toothed wheels 38, the second toothed wheel 56 increases or subtracts speed to/from the first conical toothed wheels 40 which, by means of the second conical toothed wheels 41, make the worm screws 30 rotate, to the right or to the left;

each worm screw 30, as it rotates, moves the female screw 31 toward or away from the longitudinal axis Z, which in turn moves the support slider 27 radially on which a corresponding tool 28 is mounted, with a consequent variation in the diameter of the oblong product P.

It is clear that modifications and/or additions of parts may be made to the peeling machine 10 and the corresponding method as described heretofore, without departing from the field and scope of the present invention.

It is also clear that, although the present invention has been described with reference to some specific examples, a person of skill in the art shall certainly be able to achieve many other equivalent forms of peeling machine 10 and corresponding method, having the characteristics as set forth in the claims and hence all coming within the field of protection defined thereby.

The invention claimed is:

1. A peeling machine comprises:
   an oblong product feeder (57) configured to feed an oblong product (P) along an axis of rotation (Z), and a rotating head (11) installed rotating around said axis of rotation (Z) and provided with a through central cavity (12) in which, during use, said oblong product (P) to be worked is disposed through and on which a plurality of support sliders (27) are installed to support respective tools (28) and a plurality of adjustment units (29) configured to move said support sliders (27) in a radial direction (R) with respect to said axis of rotation (Z),
   a first kinematic transmission (16) configured to transmit motion from a first motor (M1) to said rotating head (11) and to make the latter rotate, and a second kinematic transmission (33) configured to transmit motion from a second motor (M2) to said adjustment units (29) and to simultaneously adjust the radial position of said tools (28), wherein each adjustment unit (29) comprises a worm screw (30) disposed with its screwing axis (Y) in a radial direction (R) with respect to said axis of rotation (Z) and screwed onto said support slider (27), and said second kinematic transmission (33) is kinematically connected to said worm screws (30) by a toothed crown (34) installed on said rotating head (11), and
   a mechanical differential device (32) kinematically connected between said second motor (M2), said first kinematic transmission (16) and said second kinematic transmission (33), said differential device (32) being configured to take said toothed crown (34) into rotation at the same speed as said rotating head (11) and to keep said support sliders (27) in a fixed radial position when said second motor (M2) is not driven, and to make said toothed crown (34) rotate with a differential speed with respect to said rotating head (11) and to move said support sliders (27) radially when said second motor (M2) is driven.

2. The machine as in claim 1, wherein said first kinematic transmission (16) comprises a hollow shaft (17) kinematically connected to said first motor (M1), to said rotating head (11) and to said differential device (32), and wherein said second kinematic transmission (33) comprises a transmission shaft (55) installed in said hollow shaft (17) and kinematically connected to said differential device (32) and to said toothed crown (34).

3. The machine as in claim 1, wherein said toothed crown (34) is provided with an internal toothing (36) kinematically connected to said worm screws (30), and with an external toothing (37) kinematically connected to said second kinematic transmission (33).

4. The machine as in claim 1, wherein said rotating head (11) includes a support body (15) on which said support sliders (27) are slidingly installed, and wherein said toothed crown (34) is selectively rotatable also with respect to said support body (15) around an axis coincident with said axis of rotation (Z).

5. The machine as in claim 1, wherein said first kinematic transmission (16) and said second kinematic transmission (33) are configured so that, in the idle condition of the second motor (M2), the transmission ratio that is established between said first motor (M1) and said rotating head (11) is the same as the transmission ratio established between said first motor (M1) and said toothed crown (34), whereas in the active condition of the second motor (M2), the differential device (32) is configured to determine a rotation differential between said toothed crown (34) and said support body (15) of the rotating head (11).

6. The machine as in claim 2, wherein said hollow shaft (17) is provided with a transmission toothed wheel (42) solidly rotatable with the hollow shaft (17) and kinematically connected to said differential device (32).

7. The machine as in claim 2, wherein said second kinematic transmission (33) comprises a first toothed wheel (54) solidly installed on said transmission shaft (55) and defining the kinematic connection between the differential device (32) and the second kinematic transmission (33).

8. The machine as in claim 7, wherein said transmission shaft (55) is provided with a second toothed wheel (56), solidly installed on the opposite end of the transmission shaft (55) to that where the first toothed wheel (54) is installed, and wherein the second toothed wheel (56) is kinematically connected to said toothed crown (34).

9. A peeling machine comprises:
   an oblong product feeder (57) configured to feed an oblong product (P) along an axis of rotation (Z), and a rotating head (11) installed rotating around said axis of rotation (Z) and provided with a through central cavity (12) in which, during use, said oblong product (P) to be worked is disposed through and on which a plurality of support sliders (27) are installed to support respective tools (28) and a plurality of adjustment units (29) configured to move said support sliders (27) in a radial direction (R) with respect to said axis of rotation (Z), a first kinematic transmission (16) configured to transmit motion from a first motor (M1) to said rotating head (11) and to make the latter rotate, and a second kinematic transmission (33) configured to transmit motion from a second motor (M2) to said adjustment units (29) and to simultaneously adjust the radial position of said tools (28), wherein each adjustment unit (29) comprises a worm screw (30) disposed with its screwing axis (Y) in a radial direction (R) with respect to said axis of rotation (Z) and screwed onto said support slider (27), and said second kinematic transmission (33) is kinematically connected to said worm screws (30) by a toothed crown (34) installed on said rotating head (11), and a mechanical differential device (32) kinematically connected between said second motor (M2), said first kinematic transmission (16) and said second kinematic transmission (33), said differential device (32) being configured to take said toothed crown (34) into rotation at the same speed as said rotating head (11) and to keep said support sliders (27) in a fixed radial position when said second motor (M2) is not driven, and to make said toothed crown (34) rotate with a differential speed with respect to said rotating head (11) and to move said support sliders (27) radially when said second motor (M2) is driven, wherein said first kinematic transmission (16) comprises a hollow shaft (17) kinematically connected to said first motor (M1), to said rotating head (11) and to said differential device (32), and wherein said second kinematic transmission (33) comprises a transmission shaft (55) installed in said hollow shaft (17) and kinematically connected to said differential device (32) and to said toothed crown (34), and wherein said hollow shaft (17) and said transmission shaft (55) have their axes of rotation (X) disposed parallel and distanced from the axis of rotation (Z) of said rotating head (11).

10. A method for peeling an oblong product (P) which is made to transit by an oblong product feeder (57), inside a through central cavity (12) of a rotating head 11), said rotating head (11) supporting a plurality of support sliders (27) on which respective tools (28) are installed and being made to rotate by means of a first motor (M1) and a first kinematic transmission (16) around an axis of rotation (Z), said method also providing an adjustment of the position of said tools (28) by means of adjustment units (29) driven by a second motor (M2) and a second kinematic transmission (33) and which move said support sliders (27) radially with respect to said axis of rotation (Z), wherein the adjustment of the position of said tools (28) provides to make rotate, around their screwing axis (Y), worm screws (30) screwed onto said support sliders (27) and disposed with their screwing axis (Y) in a radial direction (R) with respect to said axis of rotation (Z), said worm screws (30) being kinematically connected to a toothed crown (32) which receives motion from said second kinematic transmission (33), and in that a mechanical differential device (32) kinematically connected between said second motor (M2), said first kinematic transmission (16) and said second kinematic transmission (33), makes said toothed crown (34) rotate at the same speed as said rotating head (11) and keeps said support sliders (27) in a fixed radial position when said second motor (M2) is not driven, and makes said toothed crown (34) rotate with a differential speed with respect to said rotating head (11) and moves said support sliders (27) radially when said second motor (M2) is driven.

* * * * *